United States Patent
Childs et al.

(10) Patent No.: US 11,156,264 B2
(45) Date of Patent: Oct. 26, 2021

(54) DIAGONAL ZIPPER ASSEMBLY FOR A DRAPER BELT

(71) Applicant: CNH Industrial America LLC, New Holland, PA (US)

(72) Inventors: Albert Childs, Denver, PA (US); Cory Douglas Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/737,389

(22) Filed: Jan. 8, 2020

(65) Prior Publication Data

US 2021/0207682 A1 Jul. 8, 2021

(51) Int. Cl.
*B65G 15/30* (2006.01)
*F16G 3/10* (2006.01)
*B65G 15/42* (2006.01)

(52) U.S. Cl.
CPC .................................... *F16G 3/10* (2013.01)

(58) Field of Classification Search
None
See application file for complete search history.

(56) References Cited

U.S. PATENT DOCUMENTS

| | | | | |
|---|---|---|---|---|
| 3,227,281 | A * | 1/1966 | Peterson | B01D 33/048 210/499 |
| 5,246,100 | A | 9/1993 | Stone et al. | |
| 5,267,641 | A * | 12/1993 | Hallstrom, Jr. | B65G 25/065 198/750.3 |
| 6,516,943 | B2 * | 2/2003 | Engle | F16G 3/00 198/844.2 |
| 7,690,500 | B2 * | 4/2010 | Goers | A01D 61/02 198/844.2 |
| 8,490,272 | B1 | 7/2013 | Langsdorf et al. | |
| 9,456,663 | B1 * | 10/2016 | Wheeler | A44B 19/262 |
| 10,920,851 | B1 * | 2/2021 | Cook | F16G 3/10 |

FOREIGN PATENT DOCUMENTS

| | | |
|---|---|---|
| CN | 204186877 U | 3/2015 |
| WO | 2016033801 A1 | 3/2016 |

* cited by examiner

*Primary Examiner* — Kavel Singh
(74) *Attorney, Agent, or Firm* — Peter Zacharias; Patrick Sheldrake (57) ABSTRACT

The subject disclosure provides a draper belt assembly for an agricultural harvester header that includes a draper belt and a zipper assembly along a length of the draper belt. The zipper assembly includes a first zipper track extending at a non-perpendicular angle from a fore end of a leading edge of the draper belt, a second zipper track complementary to the first zipper track extending at a second non-perpendicular angle from the fore end of a trailing edge of the draper belt, and a slider releasably connectable to the first zipper track and the second zipper track.

20 Claims, 10 Drawing Sheets

DIAGONAL ZIPPER ASSEMBLY FOR A DRAPER BELT

The exemplary embodiments of present invention relate generally to a header of a plant cutting machine (e.g., a combine harvester) and, more specifically, to a header having a draper belt assembly that includes a diagonally oriented zipper assembly.

BACKGROUND OF THE INVENTION

An agricultural harvester e.g., a plant cutting machine, such as, but not limited to, a combine, crop merger, or a windrower, generally includes a header operable for severing and collecting plant or crop material as the harvester is driven over a crop field. The header has a plant cutting mechanism, e.g., a cutter bar, for severing the plants or crops via, for example, an elongate sickle mechanism that reciprocates sidewardly relative to a non-reciprocating guard structure. After crops are cut, they are collected inside the header and transported via a conveyor such as a draper belt towards a feederhouse located centrally inside the header.

A conventional method for coupling or splicing the leading and trailing ends of a draper belt typically employs a pair of rigid connecting bars that fasten together to provide a clamping force against upstanding belt flaps or flanges provided at the leading and trailing ends of a draper belt. The connecting bars have through holes that are aligned with one another and with holes in the belt flanges. Fasteners such as threaded bolts pass through the holes of one connecting bar and the holes provided in the upstanding flanges and thereafter through the holes of the other connecting bar, whereupon they receive nuts which are tightened to provide clamping force on the belt flanges. However, with this method it is difficult to align the series of holes between all of the pieces. Furthermore, the connecting bars are oftentimes deformed and must be bent back to alignment. This method also creates poor sealing at the edges of the belt as the connecting bars are too bulky to extend to the edges of the belt which are covered by debris shields/seals.

Another current construction method involves a laced splice at the leading and trailing ends of the draper belt which involves time consuming lacing of the ends of the draper belt. Still another construction involves the use of a fixed length, endless draper belt.

However, draper belts based on current construction methods are challenging and time-consuming to install. There remains a need for new means of constructing draper belts that offer a low profile, flexibility and ease of service.

BRIEF SUMMARY OF THE INVENTION

In accordance with an exemplary embodiment, the subject disclosure provides a draper belt assembly for an agricultural harvester header that includes a draper belt and a zipper assembly along a length of the draper belt. The zipper assembly includes a first zipper track extending at a non-perpendicular angle from a fore end of a leading edge of the draper belt, a second zipper track complementary to the first zipper track extending at a second non-perpendicular angle from the fore end of a trailing edge of the draper belt, and a slider releasably connectable to the first zipper track and the second zipper track. In certain embodiments, the sum of the first non-perpendicular angle and the second non-perpendicular angle is about 180°.

In certain embodiments, the draper belt assembly can further include a lock for releasably securing the zipper assembly in a fixed position.

In certain embodiments, the draper belt assembly can include a seal covering an upper surface of the first and second zipper tracks. For example, the seal can overlap an outer surface of the draper belt to cover the first zipper track and the second zipper track upon engagement of the slider to the first zipper track and the second zipper track. The seal can be a watertight seal covering the first zipper track and the second zipper track and/or the seal can include a first seal portion coextensive with the first zipper track and a second seal portion coextensive with the second zipper track. In certain embodiments, the first seal portion and second seal portion overlap upon engagement of the first and second zipper tracks. In certain embodiments, the seal includes a plurality of seal segments and/or the seal is of unitary construction with the zipper assembly.

In certain embodiments, the draper belt includes an outer surface that includes a plurality of spaced apart lugs or ribs. The zipper assembly can have a lower profile than the plurality of spaced apart lugs or ribs. In certain embodiments, the first zipper track and the second zipper track extend across a complete width of the draper belt.

In certain embodiments, a portion of the first zipper track and the second zipper track are vulcanized to the draper belt during manufacture thereof.

Other features and advantages of the subject disclosure will be apparent from the following more detailed description of the exemplary embodiments.

BRIEF DESCRIPTION OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DRAWINGS

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Figure 1:
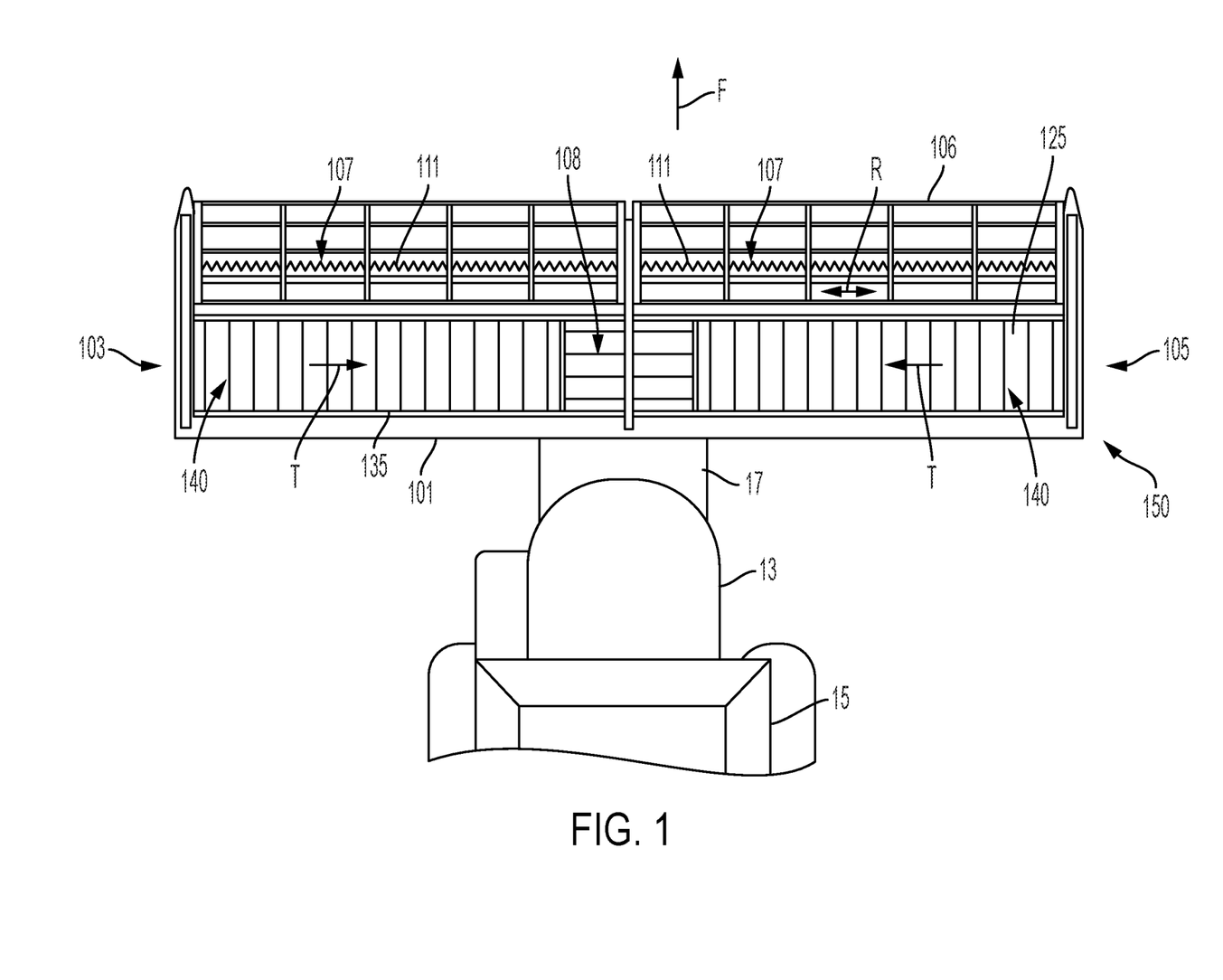
FIG. 1 is a top view of an agricultural vehicle in the form of a combine harvester in accordance with the subject disclosure.

Referring now to the drawings, and more particularly to FIG. 1, there is shown an exemplary embodiment of an agricultural vehicle 15 in the form of, e.g., a combine harvester which generally includes a chassis 13, a feeder housing or feederhouse 17, and an attachment in the form of a header 150. Typically, the combine harvester 15 will include additional internal systems for the separation and handling of collected crop material. However, these additional systems are not essential for a full and proper understanding of the subject disclosure. It should be appreciated that the draper belt described and illustrated herein does not necessarily need to be included on combine harvesters, but can be incorporated in other agricultural vehicles or devices having draper belts.

The header 150 is coupled to, and therefore supported by, the chassis 13 of the agricultural vehicle 15 by, for example, coupling to the feeder housing 17. In the exemplary embodiment shown, the header 150 is in the form of a draper header to harvest bushy or fluffy crop material. The draper header 150 has a frame 101 coupled to the chassis 13 by coupling to the feeder housing 17 and a pair of opposed lateral ends 103, 105. The draper header 150 may support one or more flexible cutter bar assemblies 107 with reciprocating knives 111 to cut crop material as the agricultural vehicle 15 travels in a forward direction, denoted by arrow F. The reciprocating knives 111, which may be referred to as cutting elements, can be reciprocated back-and-forth in a lateral direction, denoted by arrow R, relative to the forward direction F in a known manner, e.g., by a wobble box, epicyclic drive, etc. Exemplary cutting elements applicable to the present exemplary embodiments are disclosed, e.g., in U.S. Pat. Nos. 7,730,709 and 8,151,547, the entire disclosures of which are incorporated by reference herein in their entirety for all purposes.

The draper header 150 may further include a center feed belt 108 or a center auger that conveys the crop material into the feeder housing 17. The draper header 150 may also include one or more lateral, flexible draper belts 140 that are positioned rearwardly of the cutter bar assemblies 107 and travel, i.e. rotate, in opposing directions of travel, denoted by each arrow "T", in order to convey crop material inwardly to the center feed belt 108 and thereby the feeder housing 17. With reference to the forward direction F, the draper belt 140 includes a fore end 125 and an aft end 135. The header 150 may also include a rotating reel 106 with tines or the like to sweep the crop material inwardly towards the draper belts 140.

Figure 2:
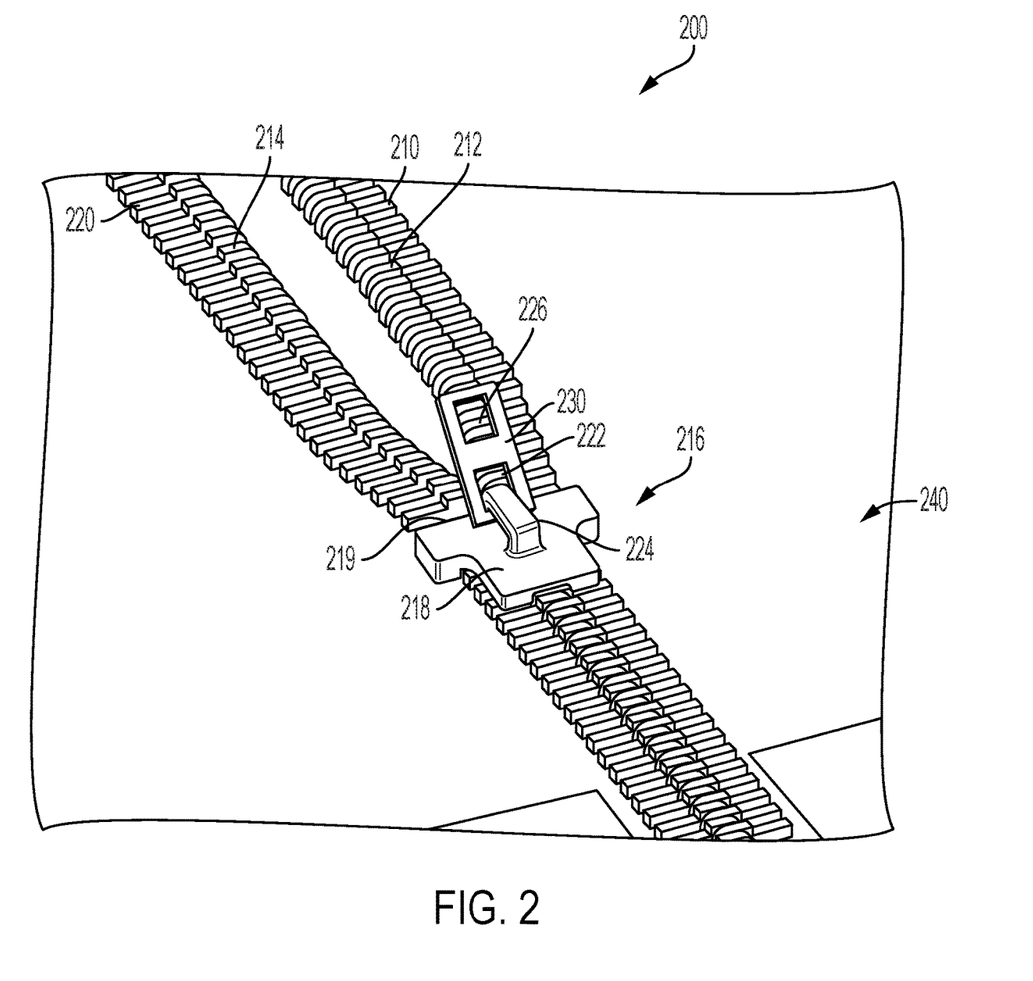
FIG. 2 is perspective view of a zipper assembly according to an exemplary embodiment of the subject disclosure.

Referring to FIG. 2, there is shown a zipper assembly 200 according to an exemplary embodiment. The zipper assembly includes a first zipper track 210 and a second zipper track 220 with elements complementary to the elements along the first zipper track. More particularly, in this particular embodiment, the first zipper track 210 has a series of elements 212 in the form of a series of hollows and the second zipper track has a second series of elements 214 in the form of a series of hooks shaped to fit inside and be received by the series of hollows 212.

A slider 216 is provided to engage the first zipper track 210 with the second zipper track 220, thereby inserting the hooks 214 of the second zipper track 220 into the hollows 212 of the first zipper track 210 upon moving the slider 216 upward, as oriented in FIG. 2. Moving the slider 216 downward, again as oriented in FIG. 2, disengages the first zipper track 210 from the second zipper track 220.

In this particular embodiment, the slider 216 includes a slider body 218 and a pull tab 230. The slider body 218 is shaped to receive the first zipper track 210 and the second zipper track 220 at an inlet 219 and merge the first and second zipper tracks. For example, the slider body 218 can contain two channels at the inlet 219 that are shaped to merge and interlock the elements to the first and second zipper tracks at a central location of the body when the slider is advanced. Other configurations can be provided according to the subject disclosure in order to provide a heavy-duty zipper.

The slider body 218 may be permanently housed along the first zipper track 210 or the second zipper track 220 with benefit of a retainer box (not shown) along the bottom of the zipper track to prevent the slider body 218 from sliding off the zipper track to which it is permanently housed. In this exemplary embodiment, the pull tab 230 is shaped to provide planar surfaces to allow the slider body to be manually manipulated. The pull tab 230 contains two apertures, a first aperture 222 along the bottom of the pull tab to engage a bracket 224 located on the slider body 218 and a second aperture 226, either or both of which can be used, for example, in conjunction with a lock for the slider 216, discussed below.

The zipper assembly 200 can be oriented such that the slider bracket 224 and pull tab 230 are disposed along the upper surface of the draper belt 240. Alternatively, the zipper assembly can be oriented such that the slider bracket 224 and pull tab 230 is disposed along the lower surface of the draper belt 140. This alternative orientation can provide a lower profile, with the pull tab 230 and bracket 224 positioned along the bottom of the draper belt so as not to interfere with the transport of crop material along the upper surface of the draper belt.

Figure 3A:
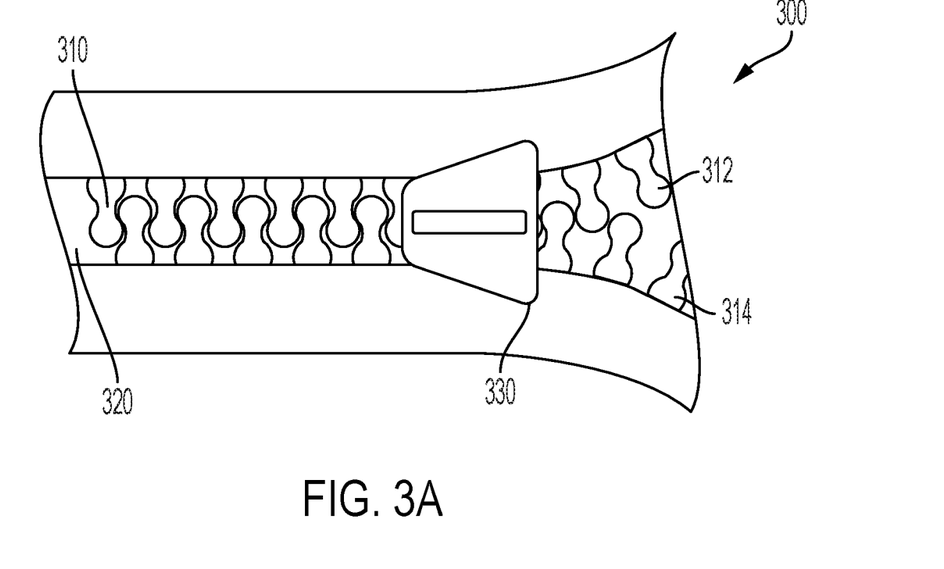
FIG. 3A is a plan view and FIG. 3B is a profile view of a zipper assembly according to an exemplary embodiment.

As shown in FIG. 3A, the elements to the first zipper track 310 and the second zipper track 320 can be in the form of interlocking and complimentary-shaped teeth, 312, 314, which can be composed of a metal or hard plastic material capable of withstanding significant force and providing an airtight and/or a waterproof seal. Other forms of complementary elements (e.g., interlocking elements) can be provided. Further, other types of suitable, heavy-duty zippers can be provided in accordance with the presently disclosed subject matter.

Figure 3B:
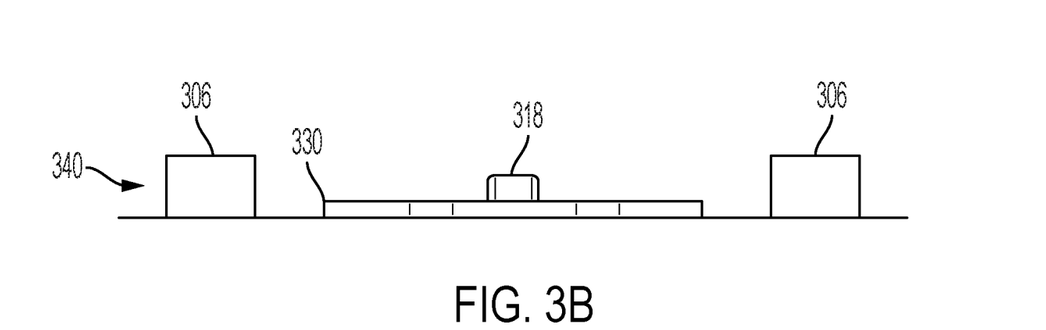

The pull tab 330 in this particular embodiment contains a flange to provide increased surface area and allow easier manual manipulation of the slider body 318 (FIG. 3B).

The zipper assembly can be provided with a low profile. For example, as shown in FIG. 3B, the slider body 318, and hence the zipper mechanism 300, has a lower profile than a plurality of spaced apart lugs 306 that extend along a width W of the draper belt 340 (see also lugs 406 in FIG. 4). As noted above, alternatively, the orientation of the slider mechanism can be such that the pull tab 330 is disposed along on the lower surface of the draper belt, so as to provide an even lower profile along the upper surface of the draper belt.

Figure 4:
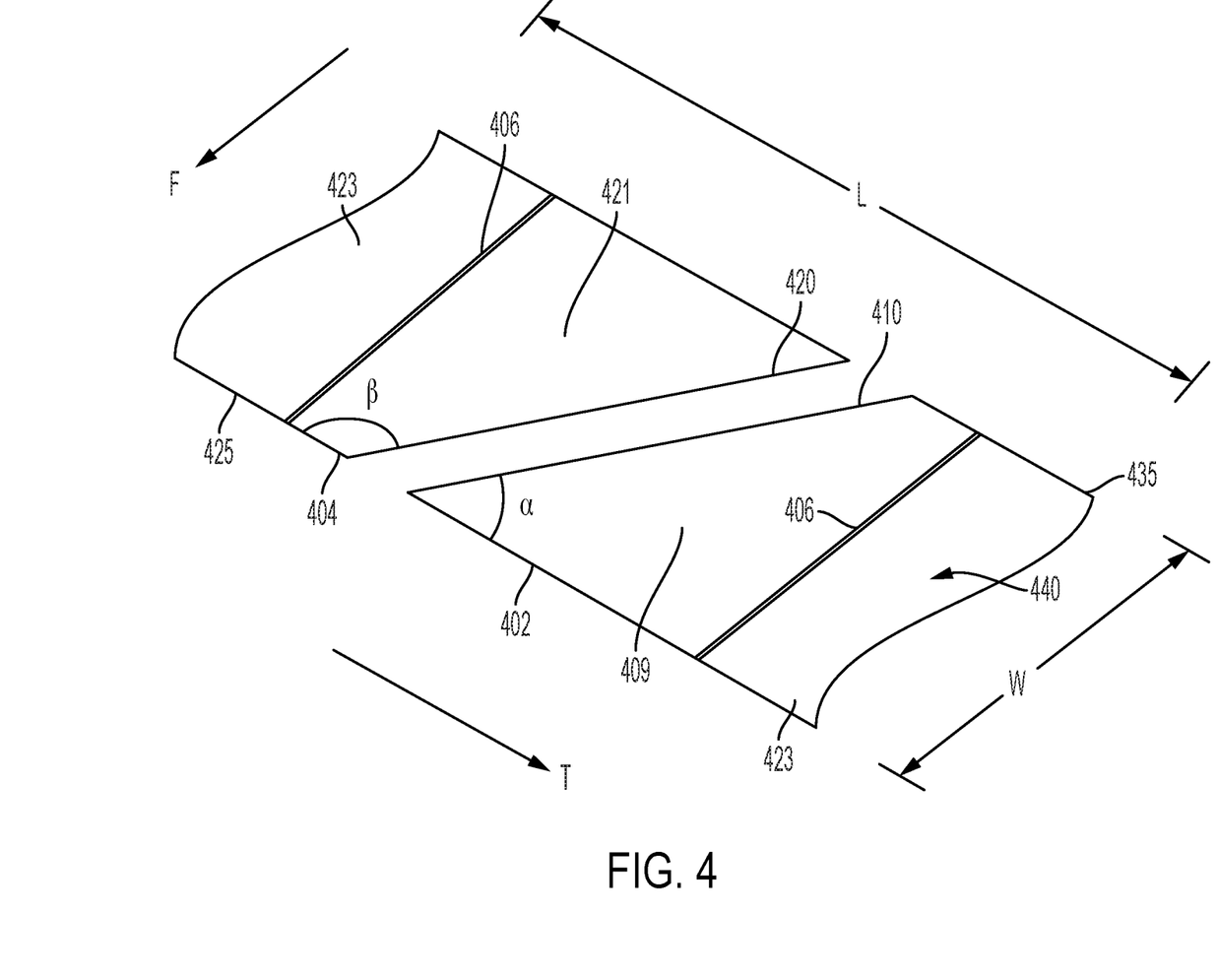
FIG. 4 is a partial schematic view of a draper belt in accordance to an exemplary embodiment.

Referring to FIG. 4, the location of the first zipper track 410 and the second zipper track 420 on the draper belt 440 is shown schematically along a length L of the draper belt 440. In this particular embodiment, the draper belt 440 is a lateral draper belt, though the subject disclosure can be provided on any draper belt on the agricultural harvester header. FIG. 4 depicts the draper belt 440 in an unassembled state, in which the elements to the zipper tracks and the slider have been omitted for purposes of clarity. The first zipper track 410 and the second zipper track 420 extend across a complete width W of the draper belt 440.

In FIG. 4, a leading edge 402 and a trailing edge 404 are provided on the fore end 425 of the unassembled draper belt 440. An upper surface 423 of the draper belt is shown is FIG. 4 for transporting crop material, with a lower surface opposite the upper surface 423 contacting a first roller and a second roller (not shown). Once the first zipper track 410 and the second zipper track 420 are connected, the rollers direct the draper belt 440 to travel in direction T simultaneous with the agricultural harvester movement in direction F. The leading edge 402 defines an edge to a leading section 409, and the trailing edge 404 defines an edge to a trailing section 421. A plurality of spaced apart lugs or ribs 406 extend perpendicularly, or substantially perpendicular from the leading edge 402 and the trailing edge 404 across, or substantially across, a width W of the draper belt 440.

As shown in FIG. 4, the first zipper track 410 extends diagonally, at a non-perpendicular angle α from (and/or relative to) the fore end 425 of leading edge 402 of the draper belt. The second zipper track 420 extends at a second non-perpendicular angle β from (and/or relative to) the fore end of trailing edge 404 of the draper belt. In certain embodiments the sum of the non-perpendicular angle α and the second non-perpendicular angle β is about 180°. In certain embodiments the sum of the non-perpendicular angle α and the second non-perpendicular angle β is 180°±1°, 2°, 3°, 4° or 5°. The first zipper track 410 and second zipper track 420 extend diagonally between adjacent lugs 406.

FIG. 4 depicts the first zipper track 410 extending at an acute angle from the leading edge 402, and the second zipper track 420 extending at an obtuse angle from the trailing edge 404 (with the leading and trailing edge disposed along the fore end of the draper belt). Alternatively, the first zipper track 410 can extend at an obtuse angle from the leading edge 402, and the second zipper track 420 can extend at an acute angle from the trailing edge 404 (again, with the leading 402 and trailing edge 404 disposed along the fore end of the draper belt).

Figure 5:
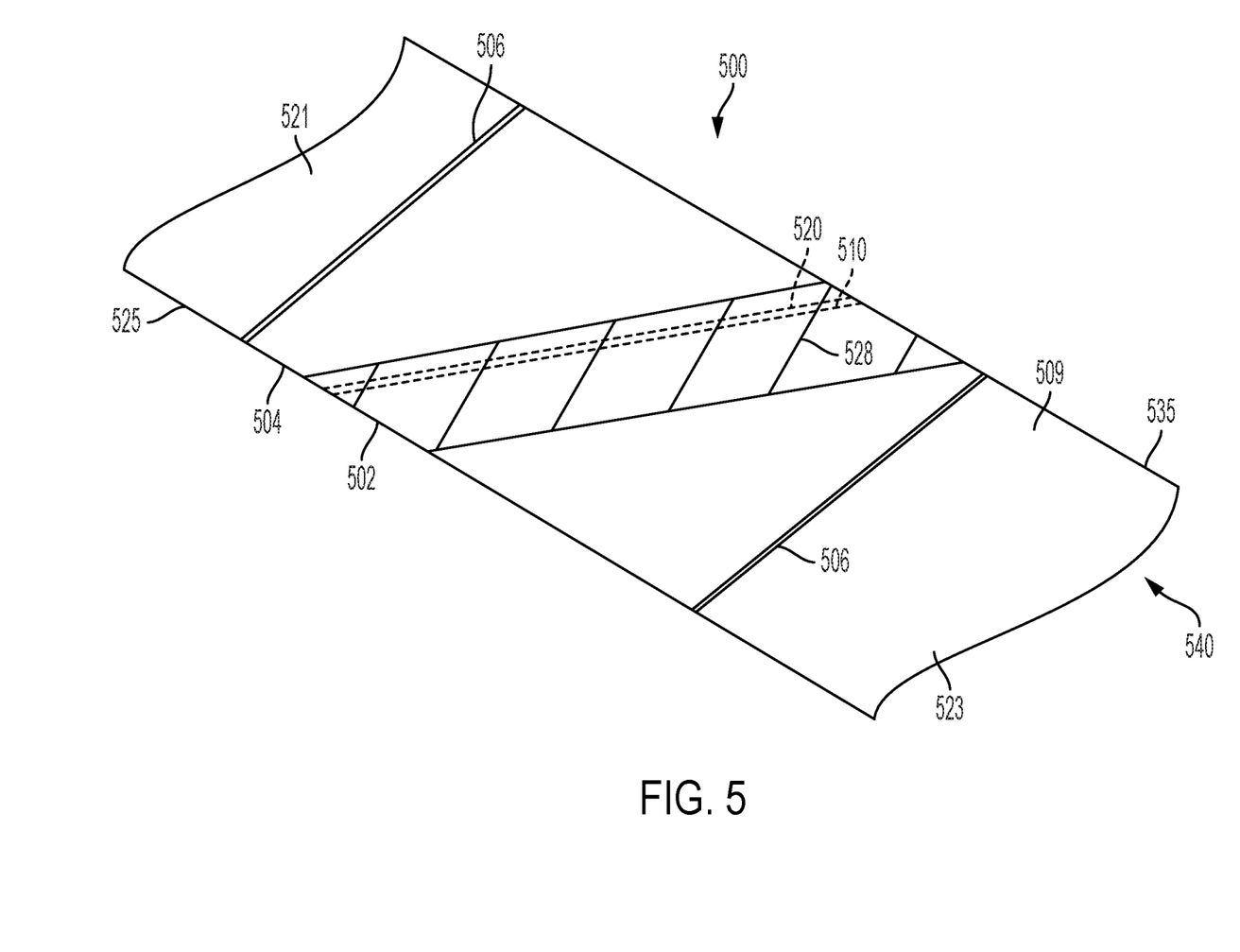
FIG. 5 is a partial schematic view of a draper belt in accordance to an exemplary embodiment.

FIG. 5 depicts the upper surface 523 of the draper belt 540 and zipper assembly 500 in which the first zipper track 510 and the second zipper track 520 are connected, and the leading section 509 is in sealed engagement with the trailing section 521 (e.g., an airtight and/or a waterproof seal). In this particular embodiment, the slider and pull tab to the zipper assembly are disposed along a bottom surface 627 of the draper belt and are thus not visible in FIG. 5. The bottom surface 627 according to an exemplary embodiment is shown below in FIG. 6, discussed below.

As shown in FIG. 5, a seal 528 extends from the leading section 509 to overlap the outer surface 523 of the draper belt and cover the first zipper track 510 and the second zipper track 520. In this particular embodiment, the seal is composed of the same material as the draper belt, though other watertight, flexible rubbers or synthetic materials can form the seal. The seal 528 lies flush against the upper surface 523 of the draper belt to provide a low profile, lower than the profile of the lugs 506.

The seal disclosed in FIG. 5 is exemplary, and other arrangements can be provided in accordance with the subject disclosure. For example, a plurality of seal segments or portions can be provided, such a seal portion extending from and/or coextensive with the leading section 509 and a seal portion extending from and/or coextensive with the trailing section 521 that overlap with each other and the first and second zipper tracks. The seal can be of unitary construction with the zipper assembly.

Figure 6:
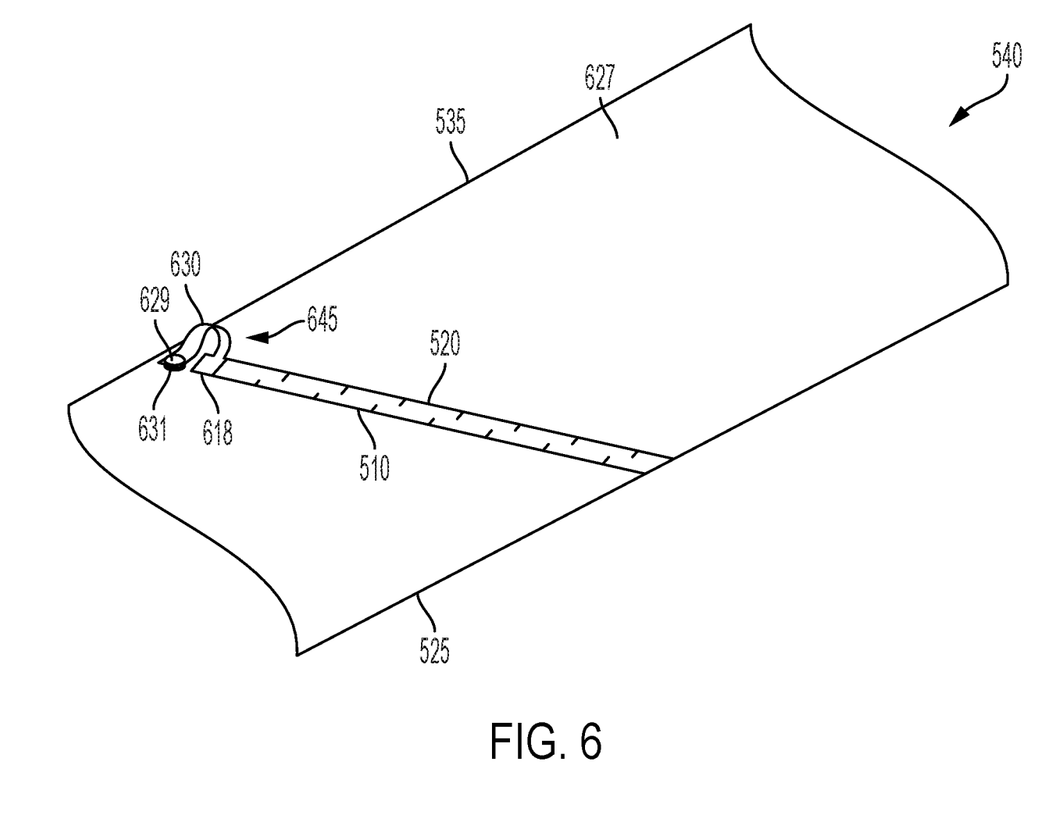
FIG. 6 is a partial schematic view of the bottom surface of the draper belt of FIG. 5.

FIG. 6 depicts the bottom surface 627 of the draper belt 540 according to an exemplary embodiment, in which a lock 645 is provided. The slider body 618 is in communication with the pull tab 630, which in this embodiment is composed of a flexible material with high tensile strength. A rivet 629 is in communication with the slider body 618, provided in this exemplary embodiment about an end of the pull tab 630. In this non-limiting embodiment, a fastener 631 is provided along the bottom surface 627 adjacent the aft end 535. The fastener 631 is, in this particular embodiment, a snap fastener shaped to receive the rivet 629 and maintain the slider body 618 in close proximity to the aft end 535 of the draper belt 540, thereby maintaining the engagement of the first zipper track 510 to the second zipper track 520 upon use of the draper belt 540.

Figure 7:
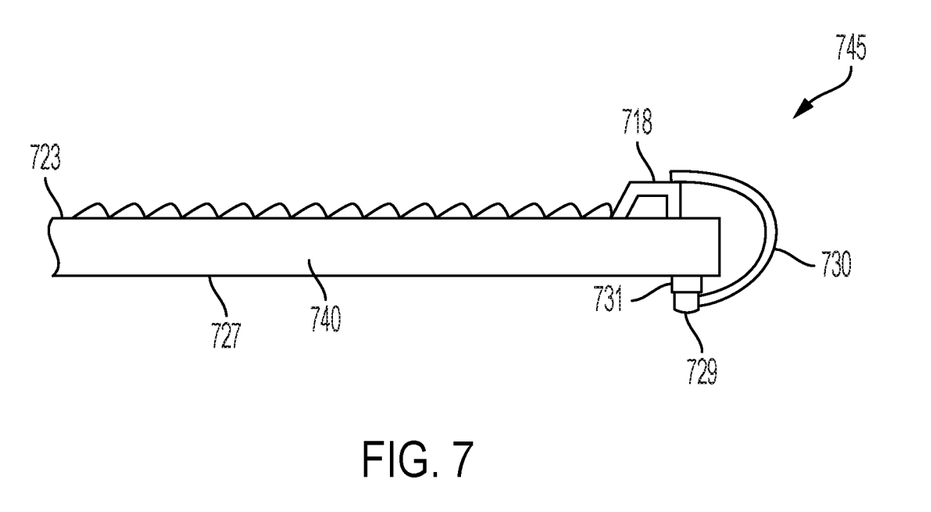
FIG. 7 is a profile view of a lock according to an exemplary embodiment.
Figure 8:
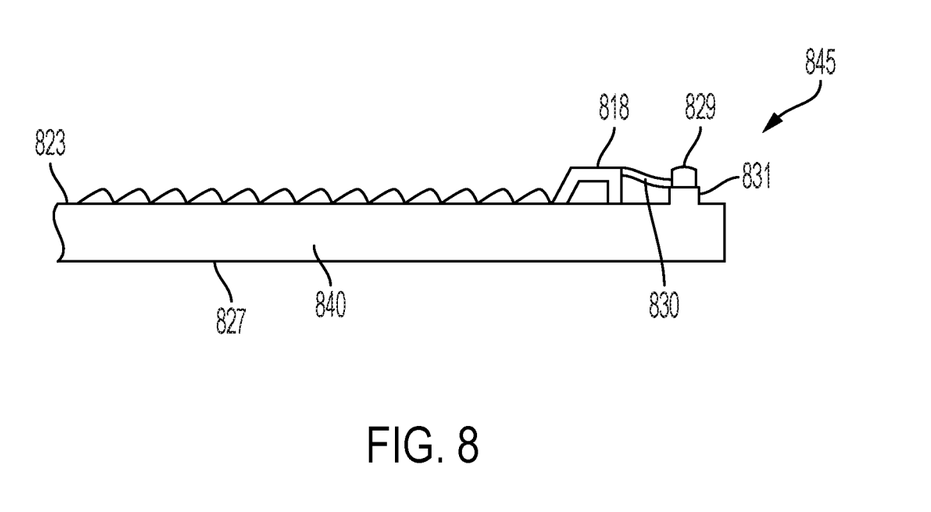
FIG. 8 is a profile view of a lock according to an exemplary embodiment.

FIGS. 7-9A, 9B depict locks according to alternative embodiments. In FIG. 7, the slider body 718 is provided along the upper surface 723 of the draper belt 740. The flexible pull tab 730, in which a rivet 729 is provided at or about an end, is of a sufficient length to wrap around the draper belt to engage the fastener 731, which in this embodiment is located on the bottom surface 727 of the draper belt 740. The rivet 729 and fastener 731 form a snap fastener as disclosed in FIG. 6, although other arrangements can be provided. As shown in FIG. 8, the fastener 831 can alternatively be provided on the same side as the slider body 818, shown in this embodiment along the upper surface 823 of the draper belt 840. Alternatively, the slider body 818, flexible pull tab and fastener can be provided along the bottom surface 827 of the draper belt 840.

Figure 9A:
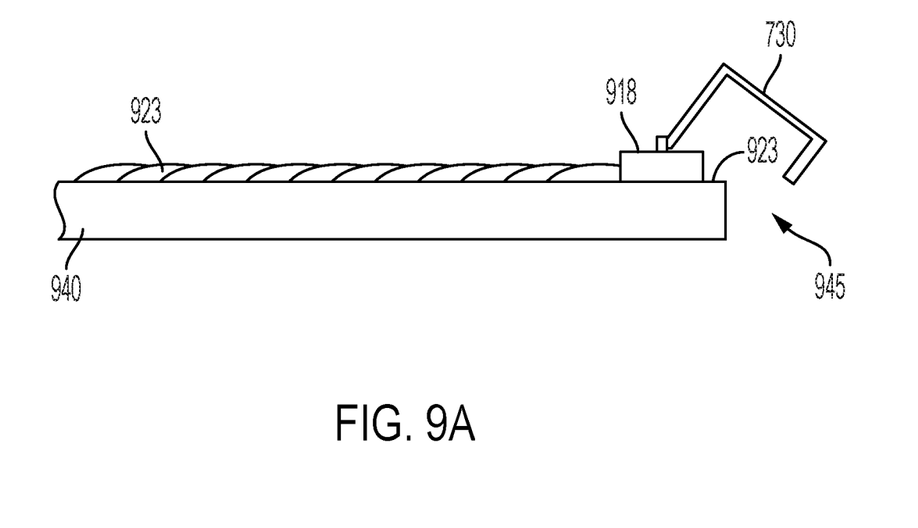
FIGS. 9A and 9B are profile views of a lock according to an exemplary embodiment, FIG. 9A depicting the lock in the unlocked position and FIG. 9B depicting the lock in the locked position.
Figure 9B:
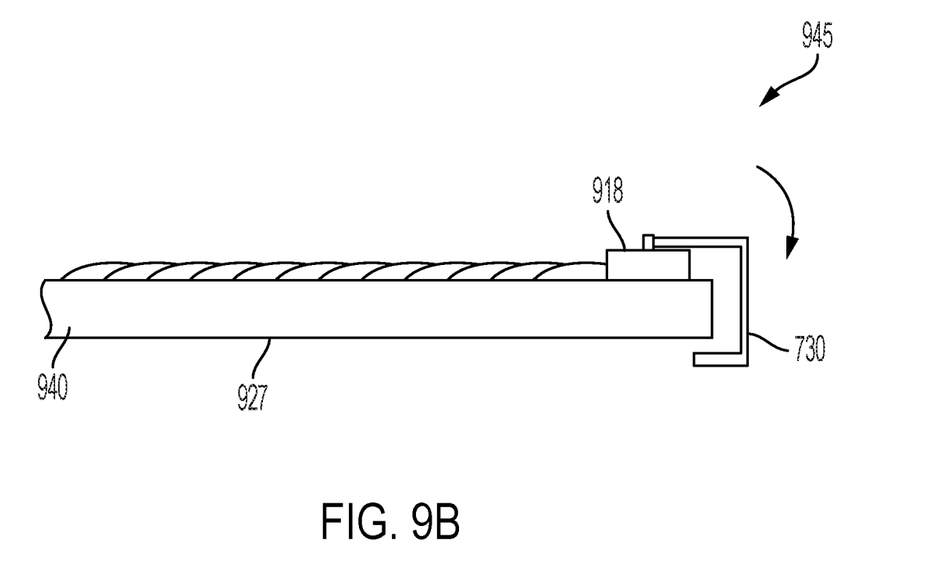

FIGS. 9A and 9B depict a lock 945 according to an alternative embodiment. In this particular embodiment, the pull tab 730 is in the form of a rigid hook or bracket that is in communication with the slider body 918, which is disposed along the upper surface 923 of the draper belt 940. The pull tab in this particular embodiment is J-shaped and capable of rotating clockwise in the direction of the arrow in FIG. 9B. As shown in the position of FIG. 9A, the zipper assembly is capable of being manipulated to zip and unzip the zipper assembly. When advanced to the position shown in FIG. 9B, the pull tab 730 encloses an end of the draper belt 940, with an end of the pull tab positioned along a length of the lower surface 927 of the draper belt. In the position shown in FIG. 9B, the zipper assembly is locked, as the slider body 918 cannot be moved to unzip the zipper assembly to disengage the first zipper track from the second zipper track.

The first zipper track and the second zipper track can be vulcanized to the draper belt during manufacture of the draper belt. Alternatively, the first zipper track and the second zipper track can be retrofitted to existing draper belts. For example, the zipper tracks can be stapled, welded or otherwise adhered to an existing draper belt to form a zipper mechanism analogously to a zipper being sewn onto a clothing garment.

As assembled and in operation, the draper belt will be driven by one or more rollers, such as a drive roller and a tensioner roller. An advantage provided by the diagonally oriented zipper assembly of the subject disclosure is that the zipper assembly does not pass over the roller all at once, but is instead spread out over time. One end of the zipper assembly passes over the roller before the other end. This reduces the load spike on the one or more rollers.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

The invention claimed is:

1. A draper belt assembly for an agricultural harvester header comprising:
   a draper belt; and
   a zipper assembly along a length of the draper belt, the zipper assembly including:
      a first zipper track extending at a first, constant non-perpendicular angle from a fore end to an aft end of a leading edge of the draper belt,
      a second zipper track complementary to the first zipper track extending at a second, constant non-perpendicular angle from the fore end to the aft end of a trailing edge of the draper belt, and
      a slider releasably connectable to the first zipper track and the second zipper track.

2. The draper belt assembly of claim 1, further comprising a lock for releasably securing the zipper assembly in a fixed position.

3. The draper belt assembly of claim 1, further comprising a seal covering an upper surface of the first and second zipper tracks.

4. The draper belt assembly of claim 3, wherein the seal overlaps an outer surface of the draper belt to cover the first zipper track and the second zipper track upon engagement of the slider to the first zipper track and the second zipper track.

5. The draper belt assembly of claim 3, wherein the seal provides a watertight seal covering the first zipper track and the second zipper track.

6. The draper belt assembly of claim 3, wherein the seal includes a first seal portion coextensive with the first zipper track and a second seal portion coextensive with the second zipper track.

7. The draper belt assembly of claim 6, wherein the first seal portion and second seal portion overlap upon engagement of the first and second zipper tracks.

8. The draper belt assembly of claim 3, wherein the seal is of unitary construction with the zipper assembly.

9. The draper belt assembly of claim 3, wherein the seal includes a plurality of seal segments.

10. The draper belt assembly of claim 1, wherein the draper belt comprises:
    an outer surface that includes a plurality of spaced apart lugs or ribs.

11. The draper belt assembly of claim 10, wherein the zipper assembly has a lower profile than the plurality of spaced apart lugs or ribs.

12. The draper belt assembly of claim 1, wherein a portion of the first zipper track and second zipper track are vulcanized to the draper belt during manufacture thereof.

13. The draper belt assembly of claim 1, wherein the sum of the first non-perpendicular angle and the second non-perpendicular angle is about 180°.

14. A header of an agricultural harvester comprising the draper belt assembly of claim 1.

15. The draper belt assembly of claim 3, wherein the seal is flush against the draper belt.

16. The draper belt assembly of claim 3, wherein the seal extends from the zipper assembly.

17. The draper belt assembly of claim 3, wherein the seal is coextensive with the leading edge of the draper belt.

18. The draper belt assembly of claim 1, further comprising a seal extending from a leading section of the draper belt and extending past the leading edge of the draper belt sufficiently to overlap the zipper assembly and a portion of a trailing section of the draper belt adjacent the trailing edge.

19. The draper belt assembly of claim 1, further comprising:

a lock for releasably securing the zipper assembly in a fixed position; and a unitary watertight seal coextensive with the first zipper track and overlapping an outer surface of the draper belt and covering an upper surface of the first and second zipper tracks upon engagement of the slider to the first zipper track and the second zipper track, and wherein the draper belt includes a plurality of spaced apart lugs or ribs and the zipper assembly has a lower profile than the plurality of spaced apart lugs or ribs, and wherein a portion of the first zipper track and second zipper track are vulcanized to the draper belt.

20. A draper belt assembly for an agricultural harvester header comprising:

a draper belt that includes:

a leading edge at a first, constant non-perpendicular angle from a fore end to an aft end of the draper belt, and     a trailing edge at a second, constant non-perpendicular angle from a fore end to an aft end of the draper belt;

a zipper assembly along a length of the draper belt, the zipper assembly including:

a first zipper track extending along the leading edge of the draper belt,     a second zipper track complementary to the first zipper track extending along the trailing edge of the draper belt, and     a slider releasably connectable to the first zipper track and the second zipper track; and   a seal extending from a leading section of the draper belt and extending past the leading edge of the draper belt sufficiently to overlap the zipper assembly and a portion of a trailing section of the draper belt adjacent the trailing edge.

\* \* \* \* \*